United States Patent [19]
Karidis et al.

[11] Patent Number: 5,684,672
[45] Date of Patent: Nov. 4, 1997

[54] LAPTOP COMPUTER WITH AN INTEGRATED MULTI-MODE ANTENNA

[75] Inventors: John Peter Karidis, Ossining; Saila Ponnapalli, Fishkill, both of N.Y.

[73] Assignee: International Business Machines Corporation, Armonk, N.Y.

[21] Appl. No.: 602,549

[22] Filed: Feb. 20, 1996

[51] Int. Cl.⁶ .............................. G06F 1/16; H01Q 1/24
[52] U.S. Cl. .............................. 361/683; 343/702
[58] Field of Search .................... 343/702, 900, 343/901; 364/708.1; 361/680, 681, 683, 686

[56] References Cited

U.S. PATENT DOCUMENTS

| | | | |
|---|---|---|---|
| 4,953,113 | 8/1990 | Chadima, Jr. et al. | 364/708.1 |
| 5,373,300 | 12/1994 | Jenness et al. | 343/102 |
| 5,504,494 | 4/1996 | Chatzipetros et al. | 343/702 |
| 5,526,411 | 6/1996 | Krieter | 379/110 |
| 5,546,094 | 8/1996 | Egashira | 343/702 |
| 5,550,552 | 8/1996 | Oxley | 343/702 |
| 5,555,459 | 9/1996 | Kraus et al. | 343/702 |
| 5,557,288 | 9/1996 | Kato et al. | 343/702 |

*Primary Examiner*—Leo P. Picard
*Assistant Examiner*—Lynn D. Feild
*Attorney, Agent, or Firm*—Robert P. Tassinari, Jr.

[57] ABSTRACT

An antenna is integrated into the laptop to increase the efficiency, convenience and ruggedness of radio frequency transmission. The antenna extends from the laptop's cover when in use for maximum efficiency but retracts when not in use for ruggedness and convenience. The antenna is a multi-modal antenna to permit efficient transmission and reception in more than one range of frequencies. The multi-modal antenna is made up of multiple segments for transmitting and receiving at different frequencies that are matched to a single terminating circuit.

12 Claims, 6 Drawing Sheets

LAPTOP COMPUTER WITH AN INTEGRATED MULTI-MODE ANTENNA

FIELD OF THE INVENTION

The present invention relates to notebook or laptop computers and more particularly, to radio frequency (RF) antennas for such computers.

BACKGROUND OF THE INVENTION

RF capability for portable computers has been enabled through the use of adapter cards in the Personal Computer Memory Card International Adapter (PCMCIA) format. Numerous RF adapter cards in this format are now available. In addition, other adapter cards containing cordless modems for both the US and European markets are under development. Typically, these adapter cards each have their own antenna that protrudes from the card and as a result from the side of the laptop with the card in the PCMCIA slot. In this position, damage to the antenna as well as the laptop can easily occur from accidental contact with the antenna. Users of the laptop have to be extremely careful in storing the laptop and using them in tight quarters. Also, the antenna extending from the side of the laptop can be shadowed by the ground plane of the display decreasing transmission efficiency.

BRIEF DESCRIPTION OF THE INVENTION

In accordance with the present invention, an antenna is integrated into the laptop to increase the efficiency, convenience and ruggedness of radio frequency transmission. The antenna extends from the laptop's cover when in use for maximum efficiency but retracts when not in use for ruggedness and convenience. The antenna is a multi-modal antenna to permit efficient transmission and reception in more than one range of frequencies. The multi-modal antenna is made up of multiple segments for transmitting and receiving at different frequencies that are matched to a single terminating circuit.

Therefore, it is an object of the present invention to provide a new antenna for laptop computers.

It is another object of the present invention to provide improved radio communication to laptop computers.

It is a further object of the present invention to provide an antenna that operates efficiently in multiple frequency ranges.

Other objects of the present invention include improving the performance, convenience, appearance and ruggedness of antennas for laptop computers.

BRIEF DESCRIPTION OF THE DRAWING

These and other objects, features and advantages of the present invention can best be understood from the accompanying detailed description of embodiments of the present invention while referring to the attached figures of which.

DETAILED DESCRIPTION

Figure 1:
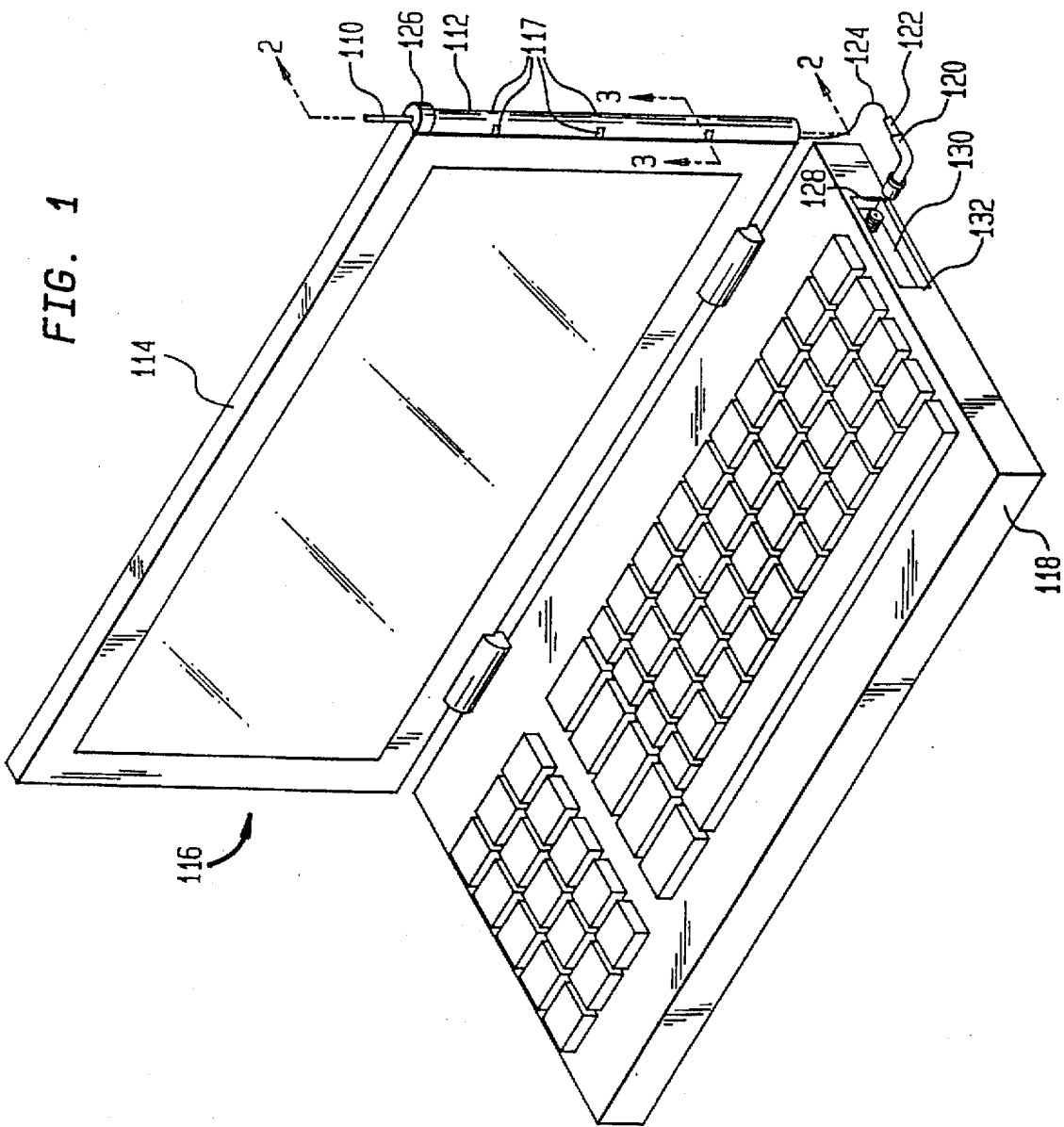
FIG. 1 is a three dimensional view of a laptop computer with an antenna attached to its cover.

Referring now to FIG. 1, a whip antenna 110 is set in a metal coated, molded plastic sleeve 112 with a semicircular cross section which entirely wraps the antenna. The metal coated sleeve is attached to the side of the cover 114 for the laptop computer 116 by flexible clips 117 attached to the side of the cover 114. The antenna 110 is electrically connected to the base 118 of the laptop 116 by a length of coaxial cable 120. A short portion of the coax 120 extends from the sleeve 112 to a RF adapter card 130 inserted into a PCMCIA slot 132 in the base 118. The center conductor 124 in the short portion of the coax 120 is shielded from electromagnetic radiation along with the contents of the metal sleeve 112 by shielding. The coaxial cable 120 runs up the interior of the shield to the front edge of cover 114 where it is attached to a L-C terminating network contained in an enlarged pack 126.

Figure 2:
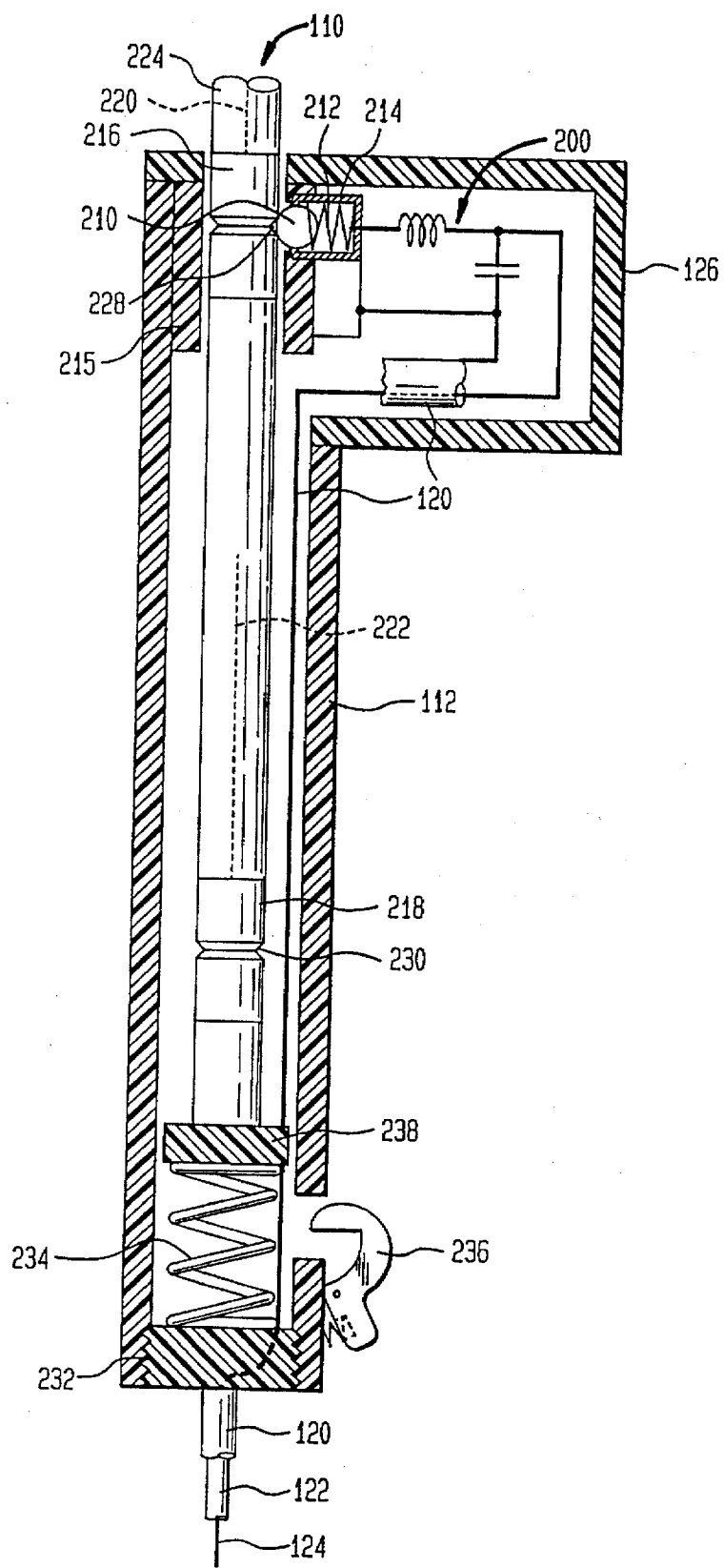
FIG. 2 is a schematic sectional view, with the antenna shown in full, taken along line 2—2 in FIG. 1.

As shown in FIG. 2, network 200 is connected to the metal case 214 of an electric contact. The pack 126 containing the L-C circuit and the shield are shown greatly enlarged here to adequately illustrate the L-C network 200. The contact is illustrated as a ball 210 that rides on a spring 212 in a metal case 214. A portion of the ball 210 extends out of an opening in the case 114 through an opening in an interior wall of a nonconductive plastic bearing 215 where it can make contact with conductive collars 216 and 218 on the whip antenna 110. Though illustrated as a ball and spring, the contact could as well be a metal plate mounted on a compliant plastic backing which contains a bump that extends inside the interior wall of the bearing to make a wiping contact with the metal collars or the contact may be any other sliding electrical contact.

The whip antenna 110 contains two metal lengths 220 and 222 embedded in a plastic rod 224 which is transparent to electromagnetic radiation. The lengths of metal 220 and 222 are approximately $\lambda/2$ or $\lambda/4$ long where $\lambda$ is the wavelength of the frequency of operation. The collars 216 and 218 are embedded in the rod 220 with each collar making electrical contact to one of the metal lengths 220 or 222. The two metal lengths are sufficiently spaced from one another so that they are substantially decoupled from one another.

The surfaces of the embedded collars 216 and 218 are nominally flush with that of the plastic sides of the cylindrical antenna or plated on the plastic so that the antenna slides smoothly in nylon bearing 215 in the sleeve. The metal collars 216 and 218 each contain a groove 228 or 230. These grooves 228 and 230 form a detent position for whip antenna 110. As the antenna slides in the bearing in the sleeve, the ball or bump drops into the groove providing a positive indication that the antenna is properly extended and electrically connected.

When the antenna is not in use, it is fully retracted into the sleeve to prevent accidental damage. When the whip antenna is partially extended and the shorter metal element exposed, the larger metal element 222 and sleeve 112 form a capacitive load upon the impedance of the shorter element 220. When the whip antenna is fully extended, a certain amount of capacitive loading on the longer element 220 by the shorter element 222 also occurs even though the antenna elements are spaced one from the other. The single terminating impedance 200 can be used to match both antenna segments to the coaxial line 120.

The antennas are designed to accommodate two frequency ranges. LAN adapters use the Industrial Scientific and Medical (ISM) band of 2.4 to 2.496 gigahertz (GHZ). Advanced Mobile Phone/Cellular Digital Packet Data (AMPS/CDPD) adapters utilize the 825 to 895 megahertz (MHz) band. ARDIS adapters operate in the 800 to 870 MHz band. RAM adapters operate in the 860 to 940 MHz range, and Global System for Mobile Communication (GSM) adapters for the European market operate in the 890 to 960 range. This would indicate that there is a present need for at least one dual-mode antenna. In the future, additional frequency ranges may have to be accommodated. One way more ranges can be accommodated in a single unit, is by having replaceable antenna cartridges. A threaded metal cap 232 at the bottom of the sleeve 112 retains a weak spring 234 and the whip antenna 110 within the sleeve. Removal of the cap 232 allows the spring and the whip antenna cartridges to drop out permitting replacement of the antenna cartridge 110 with one responsive to different frequency ranges.

When the antenna is fully retracted in the sleeve, the spring 234 is held compressed by a spring loaded catch 236 that grasps a lip 238 at the bottom of the antenna cartridge 110. Besides functioning with the clasp 236, the lip 238 acts as a guide to keep the antenna straight as it moves through the sleeve. When the catch is pressed, it pivots out of the way and releases the lip 238. This allows the spring to force the cartridge upwards so that the antenna extends sufficiently from the front of the cover to be grasped. The antenna can then be pulled out until the ball 200 slips in the first detent 228 to hold the first element 220 in its extended position. To expose the second element 222, the end of the antenna is again pulled until the ball 200 falls into the second groove 230. The lip 238 contacts the nylon bearing 215 if the antenna is accidentally pulled too far.

Figure 3:
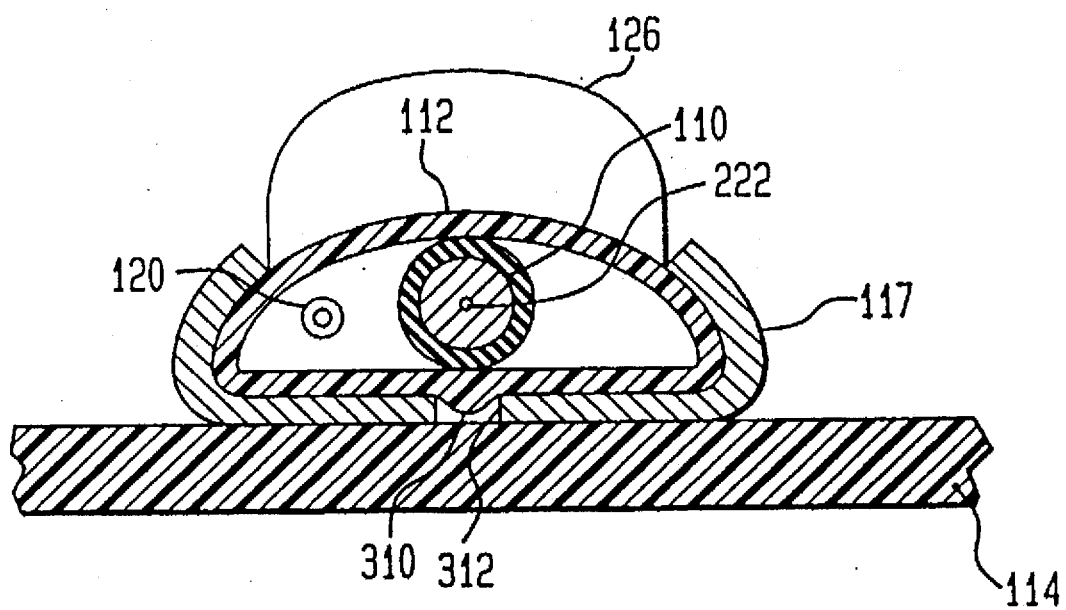
FIG. 3 is a schematic sectional view taken along line 3—3 in FIG. 1.

As shown in FIG. 3, the sleeve 112 fits into the flexible clips 117 on the side of the cover 114, these clips conform to the sides of the sleeve to hold the sleeve in place. The sleeve has two bumps 310 on its flat face that seat in depressions 312 in the clips when the sleeve is properly positioned. Alternatively, a channel could be provided in the side of the cover with interior sidewalls that had a cross section that conforms to the sides of the sleeve, or could be a velcro strip, or an adhesive could be used to adhere the antenna to the cover. The antenna module can be sold with the laptop or can be sold as an after market add-on.

Referring back to FIG. 1, there is a male connector 128 at the end of the coax 120. With the RF deck 130 inserted into the PCMCIA slot, the male connector 128 inserts into a female connector in the exposed face of the RF deck. This arrangement requires only a minimal redesign of the RF deck 130 replacing the antenna with the female receptor. Also, the arrangement maintains maximum separation between the digital portion of the deck and the antenna minimizing interference between the digital and RF signals. Alternatively, the connector 128 could plug into the base unit 118 adjacent the slot 132 and a connector in the base unit with a contact on the side of the PCMCIA card.

Figure 4:
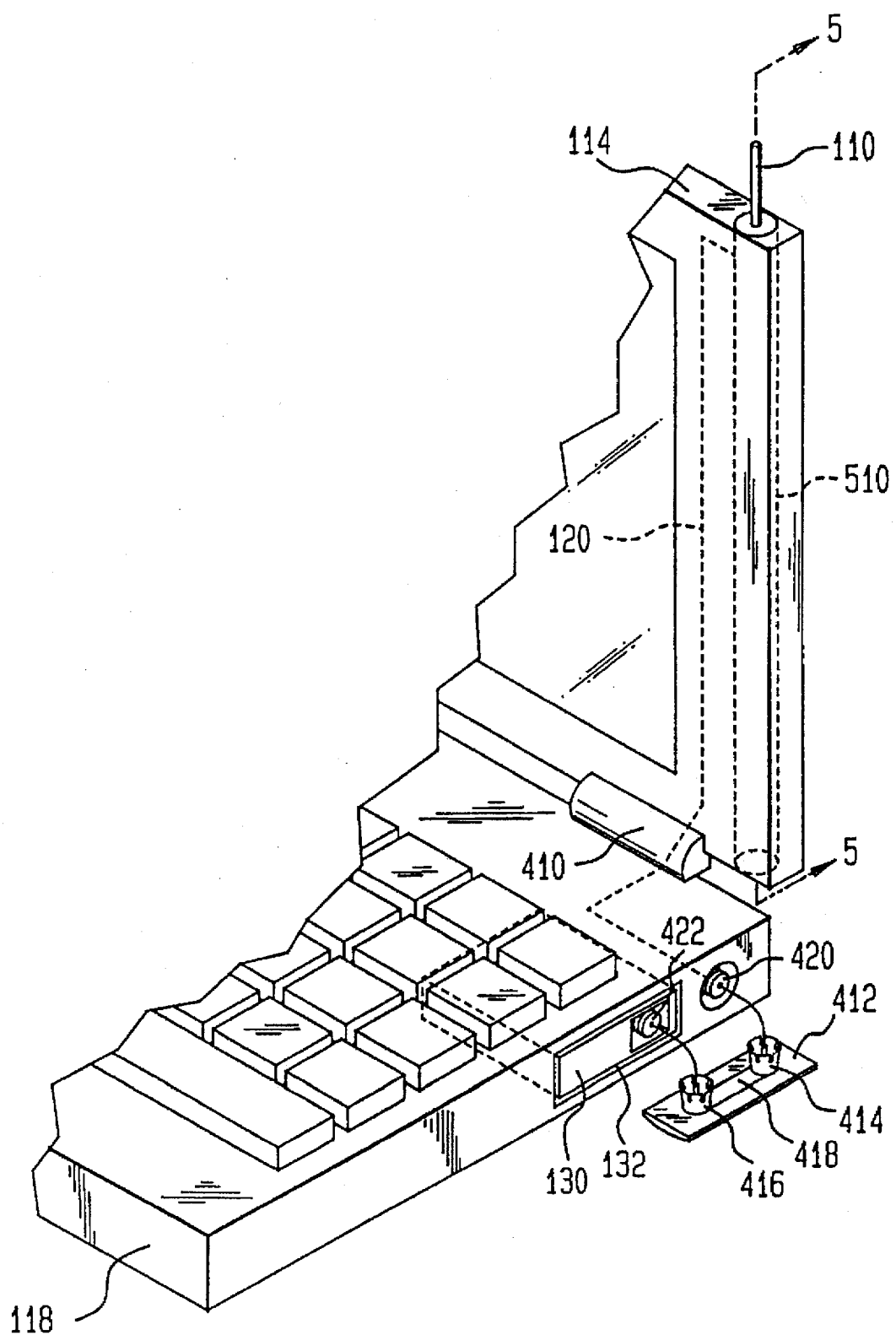
FIG. 4 is a partial view of a laptop computer with an antenna incorporated into the cover.
Figure 5:
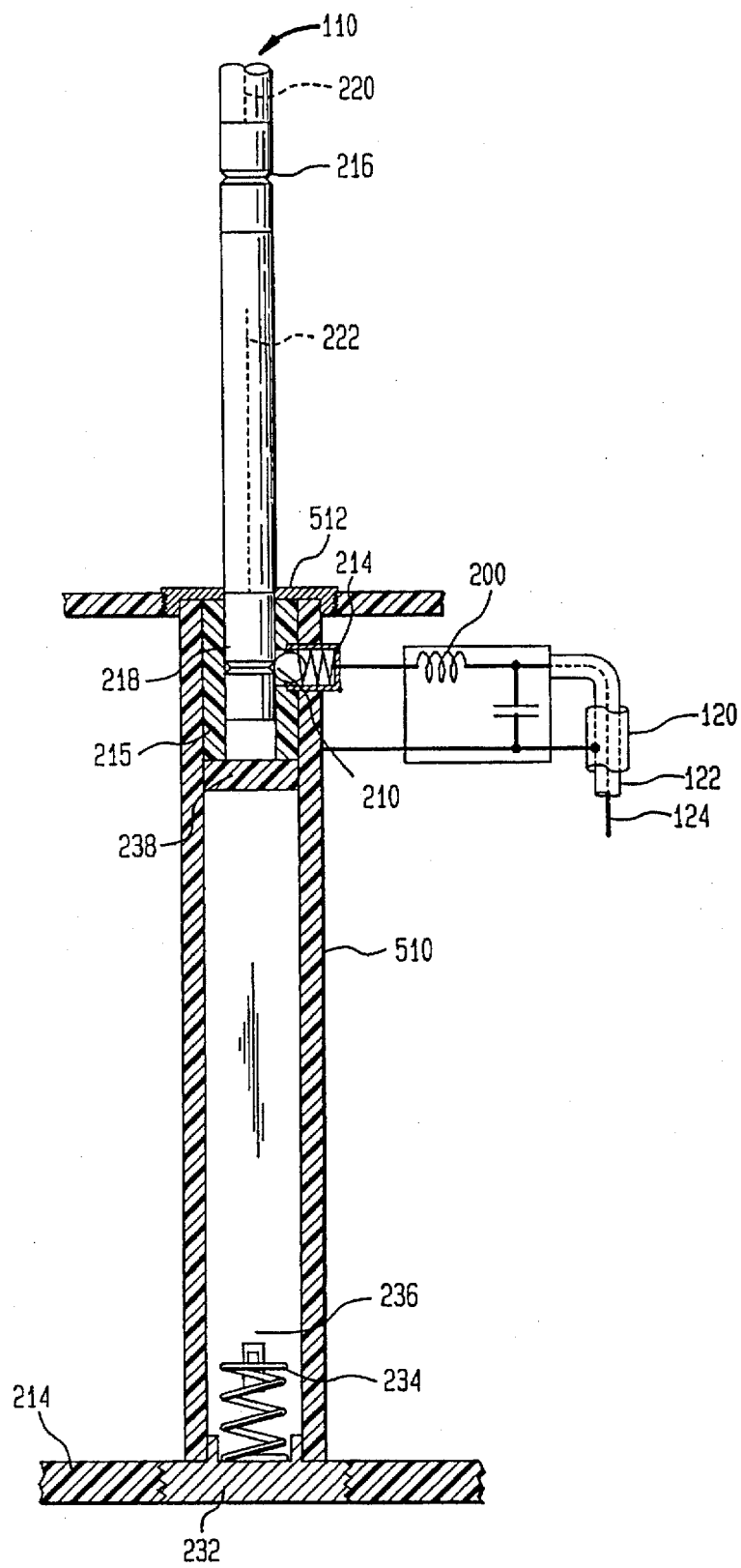
FIG. 5 is a schematic sectional view, with the antenna shown in full, taken along line 5—5 in FIG. 4.

An alternative embodiment of the present invention is shown in FIGS. 4 and 5. In this embodiment, the whip antenna unit 110 is set within the cover of the laptop instead of being attached to the outside edge of the cover. The whip antenna unit is positioned within a cylindrical plastic sleeve 510. An electromagnetic shielding sleeve is not needed here since the cover casing shields the antenna from electromagnetic radiation when the antenna is retracted. The antenna module is substantially similar to that in the embodiment of FIGS. 1, 2 and 3 with identical elements numbered the same as in FIGS. 1 to 3. Here a threaded cover in the back edge of the cover 114 permits removal and replacement of the antenna cartridge by removing the spring and the cartridge 110 and replacing the cartridge with a cartridge covering different RF ranges. The casing 510 threads into the back edge of the cover while a bezel 412 in the front edge covers the unit.

Another distinction is that neither the coupling network nor the coax is in the sleeve. The coaxial cable 120 runs down the inside of the cover, and through the hinge 410 joining the cover to the base of the laptop where it terminates in a female connector adjacent the RF deck. A cover 412 for the RF adapter card in the PCMCIA slot contains two male contacts 414 and 416 joined by an RF strip 418. While shown, for illustrative purposes, as spaced from the adapter, the cover is actually affixed to the adapter or alternatively pivots on the base. These male connectors mate with the female connectors 420 and 422 on the base and the deck respectively. An alternative arrangement is to have the coax end in a connector in the wall of the slot which mates with a contact in the radio frequency deck adjacent to the receiver/transmitter of the deck.

Figure 6:
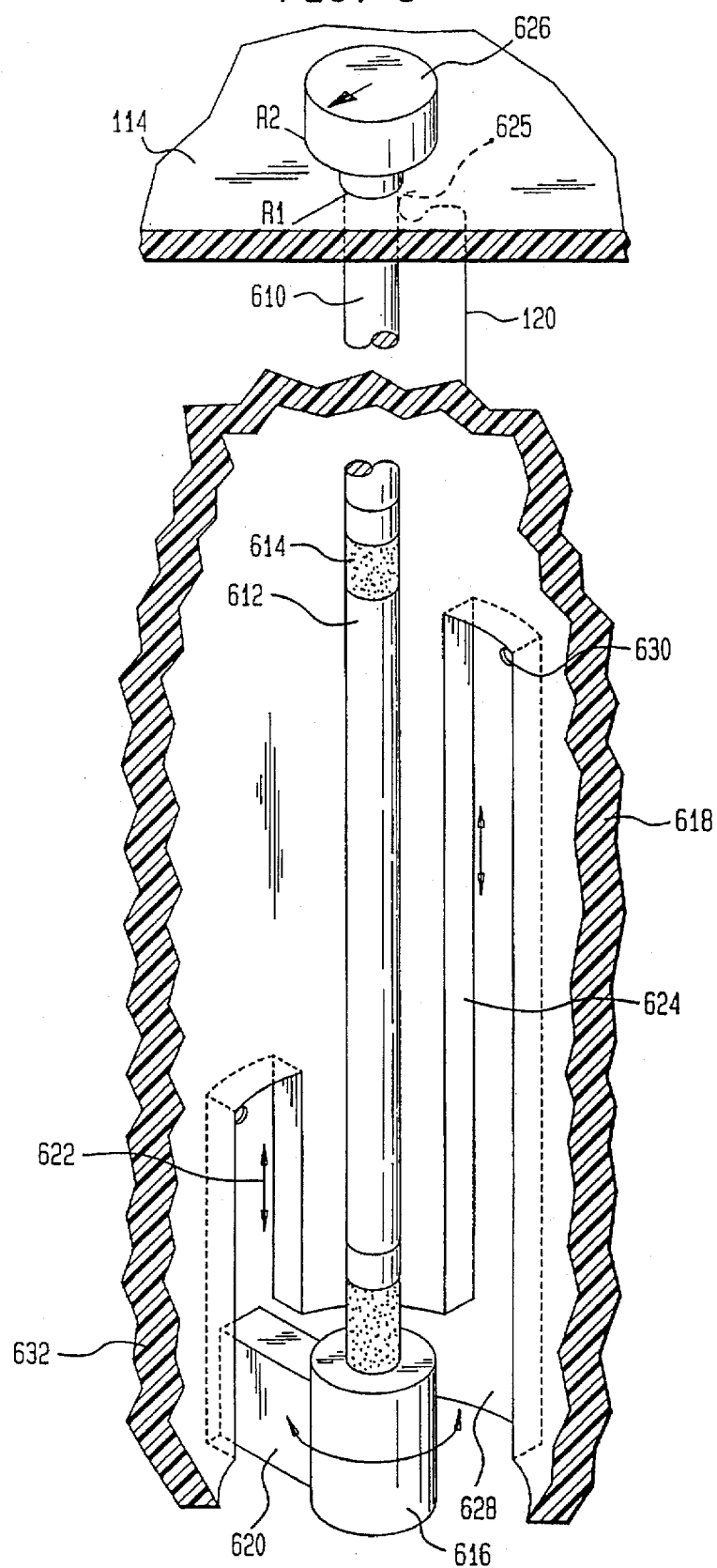
FIG. 6 is a three dimensional representation of an alternative antenna unit that can be used with laptop computers shown in FIGS. 1 and 4.

An alternative form of the antenna unit is shown in FIG. 6. Two antennas in the form of metal rods 610 and 612 are joined by a nonconductive plastic spacer 614. A plastic collar 616 attached to the end of the longer rod 612 is free to slide upwardly in a plastic sleeve 618 surrounding the antenna unit only when a key 620 on the collar is in one of the grooves 622 or 624. If the key is in the shorter of the grooves, the antenna unit can be pulled upwardly to the point where the shorter metal rod 610 is outside the laptop's shielding cover for reception or transmission on one of the two frequency bands. If the key is in the other groove, the antenna unit can be fully extended allowing the longer rod 612 to transmit and receive electromagnetic energy in the other frequency band. A spring loaded contact 624 wipes against the metal rods 610 and 612 to couple electric signals through the cable 120 between the antenna unit and the RF deck 130 in FIG. 4. A knob 626, attached to the end of the shorter metal rod 610, sits on the surface of the cover 114 when the antenna unit is retracted. The knob is rotated to select the communication band. The knob 626 has an arrow on it. The cover 114 has two lines each of which is identified by a frequency range R1 or R2. In the antenna units retracted position, the key 620 is free to pivot in a cavity 628 in the base of the sleeve 618 between the two lines. When the arrow is aligned with either of the marks on the case, the key is under one of the grooves 622 and 624 and the antenna unit can be pulled from the case to the extent determined by the length of the groove. A detent mechanism 630, such as a spring loaded ball 630, fits into a groove 632 in the key to latch the antenna unit into either its partially or fully extended positions.

Above we have described embodiments of a whip antenna that can be incorporated into a laptop computer. As pointed out previously, there is significant shadowing of present day PCMCIA antennas that extend from the base. Measurements have shown that with optimal whip antenna, such as the described end fed, half-wave length, antenna (or a dipole antenna), there is an improvement of 13–15 dB in minimum radiated power when the antenna extends away from the cover instead of the side of the base. This implies a 30 times improvement in transmitted power and a resultant increase of transmission distance by 5 times in certain directions of transmission.

Above were described multiple embodiments of the present invention. Many modifications and changes in these embodiments will be readily apparent to those skilled in the art without departing from the spirit and scope of the invention as evidenced by the following claims.

What is claimed is:

1. In a laptop computer with a cover unit containing a display screen, and a base unit with a slot in the side of the base unit having a radio frequency adapter therein, the improvement comprising:
   a) a multimode antenna unit including:
      i) electromagnetic radiation shielding means;
      ii) whip antenna having two electromagnetically decoupled conductors, the length of each conductor selected to be tuned to a different frequency range, which conductors are encased in a dielectric plastic rod that moves in and out of one end of the electromagnetic radiation shielding means and when out of the electromagnetic radiation shielding means receive electromagnetic radiation; and
      iii) electrical contact means at the end of each of the conductors for making electrical contact to each of the conductors;
   b) coupling means to incorporate said multimode antenna unit as part of the cover unit; and
   c) connection means to couple an electromagnetic radiation signal from said the electrical contact means of the antenna unit to the radio frequency adapter in said slot so that the radio frequency adapter operates optimally in one frequency range when the antenna is partially extended and another range when the antenna is fully extended.

2. The laptop computer of claim 1 wherein said coupling means is a receptacle in the interior of the cover unit of the laptop computer near the edge of the cover adjacent the slot.

3. The laptop computer of claim 2 wherein said multimode antenna is an add-on antenna unit which comprises a removable antenna cartridge that can be removed from said receptacle in said cover which antenna cartridge when extending out of the cover extends from a front edge of the cover to receive electromagnetic radiation.

4. The laptop computer of claim 3 wherein said connector means includes an LC terminating network at the end of the connection means adjacent the electrical contact means.

5. An antenna unit for a laptop computer with a display screen in a cover unit and a slot in the side of a base unit which slot is adapted for the receipt of radio frequency deck, said antenna unit comprising:
   a) an electromagnetic radiation shielding sleeve that attaches to a receptacle on the exterior edge of the cover unit;
   b) a whip antenna that moves in and out of the electromagnetic radiation shield which when out of the shield extends from a front of the cover to receive electromagnetic radiation wherein said antenna comprises two different length electromagnetically decoupled conductors encased in a plastic rod the conductor lengths being selected for optimal operation in different frequency ranges so that the antenna operates optimally in one range of frequencies when partially extended from the shield and only one of the conductors is exposed to electromagnetic radiation and optimally in another range of frequencies when fully extended from the shield and the other conductor is exposed to electromagnetic radiation; and
   c) a shielding means which extends from the end of the sleeve adjacent the back edge of the cover for coupling electromagnetic radiation to the base unit.

6. A laptop computer comprising:
   a) a base unit with a slot in a side thereof adapted to receive a radio frequency deck;
   b) a cover unit containing a display screen connected by pivots at one end to the base unit to expose the display screen when open;
   c) an antenna unit which is part of the cover unit;
   d) a whip antenna module that moves in and out of the antenna unit which when extended from the front of the cover receives electromagnetic radiation; said antenna module comprising two electromagnetically decoupled conductors of different lengths spaced by a non-conducting material, each conductor with a contact means at one end thereof so that the antenna operates in one range of frequencies using one of the conductors when the antenna is partially extended and a different range of frequencies using the other of the conductors when the antenna is fully extended;
   e) electrical connector means in said antenna unit for making mechanical contact with the contact means on one of the conductors when the antenna is partially extended and the contact means on the other of the conductors when fully extended.

7. The laptop computer of claim 6 wherein said antenna unit is attached to the side of the cover unit in an electromagnetic radiation shielding sleeve.

8. The laptop computer of claim 6 including:
   a) key means on said antenna module;
   b) a sleeve in the antenna unit for the receipt of the antenna module said sleeve with different length grooves therein both running parallel to the length of the antenna module to receive said key means to limit upward movement of the antenna module from the cover unit to said partially extended position when the key is in one of the grooves and to said fully extended position when the key is in the other groove; and
   c) means for rotating and translating the antenna module within the sleeve to place the key means in one or the other of the grooves.

9. The laptop computer of claim 8 including
   a) a radio frequency deck inserted in said slot; and
   b) a cable means that extends from the contact to the radio frequency deck to transmit electrical signals from the antenna to the deck.

10. The laptop computer of claim 9 wherein said conductors are two spaced apart straight elements axially aligned with each other one of the elements length being ¼ or ½ of the wavelength $\lambda_1$ of a frequency in one of the ranges and the other elements length being ¼ or ½ of the wavelength $\lambda_2$ of a frequency in the other of the ranges.

11. The laptop computer of claim 9 wherein said antenna unit is contained within the cover unit which is made of an electromagnetic shielding material and the cable means runs through the cover unit and one of the pivots connecting the cover unit to the base to a terminal in the base unit.

12. The laptop computer of claim 11 including a connector for connecting the terminal in the base unit to the antenna unit.

* * * * *